Dec. 16, 1958  H. F. DALGLISH  2,864,878
THERMOCOUPLE CABLE SUSPENSION
Filed July 12, 1954
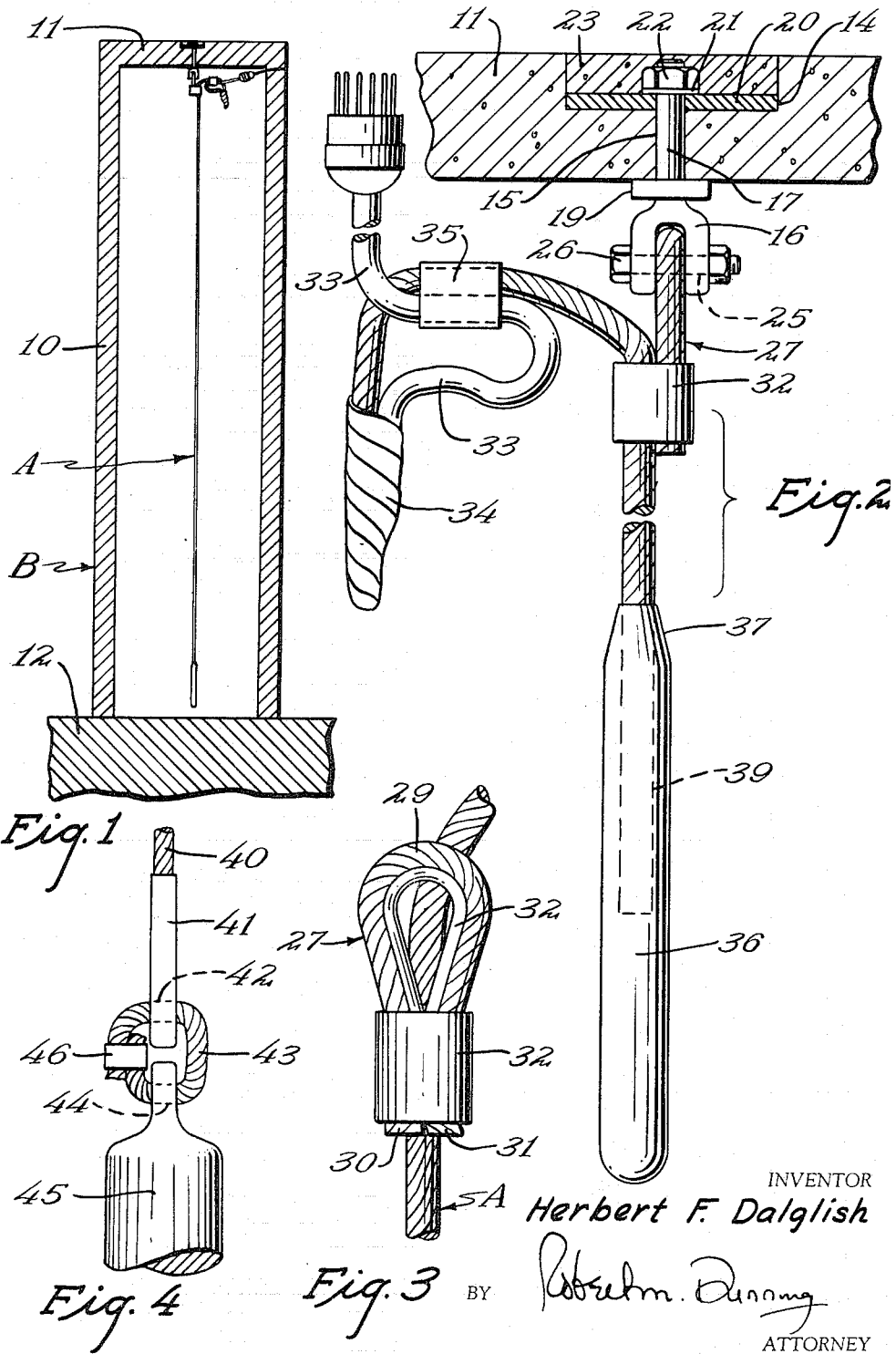
INVENTOR
Herbert F. Dalglish
BY Robert M. Dunning
ATTORNEY

United States Patent Office 2,864,878
Patented Dec. 16, 1958

2,864,878

THERMOCOUPLE CABLE SUSPENSION

Herbert F. Dalglish, St. Paul, Minn., assignor to Mark W. Gehan, St. Paul, Minn.

Application July 12, 1954, Serial No. 442,715

8 Claims. (Cl. 136—4)

This invention relates to an improvement in thermocouple cable suspension and deals particularly with a novel and unusual method of suspending thermocouple cables.

Thermocouple circuits are oftentimes employed in grain bins and the like so that the temperatures at various depths within the bed of grain may be easily determined. For many years, these thermocouple circuits were enclosed within pipes secured to the walls of the bin. However, in recent years, the use of flexible members of one type or another have become increasingly popular. These flexible members are usually suspended from the top of the bin and have in the past been anchored to the bottom of the bin by means such as a shear pin which will release the lower end of the cable in the event the strain of the swirling mass of grain upon the cable becomes excessive. With such an arrangement, it is necessary to enter the bin after the grain has emptied therefrom and to replace the shear pin.

A feature of the present invention resides in the provision of a thermocouple cable having a weight suspended at its lower end, the weight being supported out of contact with the bottom of the bin. When grain is inserted or removed from the bin, the lower end of the cable may move sufficiently to prevent the exercise of an undue strain upon the body of the cable.

A further feature of the present invention resides in the provision of a novel means of supporting the cable. The thermocouple cable is provided with a series of thermocouple wires forming a core and a series of strands of wires forming a wire rope or cable encircling this core. While the exterior portion of the cable is extremely strong, the core is relatively delicate. In order to support the cable a loop of steel wire is formed, the ends of the loop being directed downwardly and placed in parallel relation to the thermocouple cable. A metal ring encircles the two ends of the loop and the body of the cable near the upper end thereof. This metal ring is swaged or otherwise secured to the cable and to the ends of the loop thus forming a suspension which places the minimum strain upon the body of the cable. Preferably, a general channel shape liner is positioned within the loop to further reinforce the same and to distribute the weight upon the looped portion of the loop.

A further feature of the present invention lies in the specific manner employed for forming an electrical connection with the various thermocouple wires. A lead cable is secured to the upper extremity of the thermocouple cable, the thermocouple wires forming the cable core projecting beyond the end of the outer portion of the cable. The end of the lead cable is then wired to the various wires of the thermocouple cable. As the clip fastens the lead cable to the outer portion of the thermocouple cable, no strain may be exerted upon the portion of the two cables where they are connected and joined.

These and other objects and novel features of my invention will be more clearly and fully set forth in the following specification and claims:

In the drawings forming a part of the specification;

Figure 1 is a diagrammatic sectional view through a grain bin showing in general the manner in which the thermocouple cable is supported therein.

Figure 2 is an elevation view of the upper and lower portions of the thermocouple cable, showing the ends of the cable and the manner in which the cable is supported.

Figure 3 is an elevational view of the support for supporting the cable in suspended position.

Figure 4 is an elevational view of a modified form of cable weight.

Thermocouple cables are employed in various locations and in many different environments. Therefore, the suspension illustrated in Figure 1 of the drawings is merely typical of the type of suspension which may be used. In the particular arrangement illustrated, the thermocouple cable A is suspended within an elevator or grain bin B which is generally cylindrical in form and which is elongated vertically. The bin B includes generally cylindrical side walls, such as 10, and a top slab 11 forming a top for the bin. The bin is mounted upon a suitable foundation which is indicated in general by the numeral 12.

As is indicated in Figure 2 of the drawings, the cast slab 11 which forms the top of the bin A is provided with a generally rectangular recess 14 in its upper surface above the location of the thermocouple cable. An opening 15 is also formed through the slab 11 communicating with the center of the recess 14. A hanger 16 is inserted upwardly through the opening 15, this hanger including a shank 17 having a threaded upper extremity. The shank 17 is provided with a collar 19 which may abut against the undersurface of the slab 11. The shank 17 extends through a generally rectangular metal plate 20 which fits into the rectangular recess 14 and is designed to distribute the weight of the cable over a considerable area of the slab. A washer 21 and a nut 22 are applied to the upper end of the shank 17 and the upper threaded end of the shank is preferably riveted over so that the nut cannot be accidentally disengaged. The recess 14 is then filled with a layer of cement 23 or other suitable material so that the entire upper end of the hanger is enclosed. The shank 17 is provided with a bifurcated lower end as illustrated in Figure 2. Apertures 25 extend through the spaced portions of the bifurcated end to accommodate a removable bolt 26. This bolt 26 is of sufficient size and strength to support the weight of the cable and to connect to the hanger.

Figures 2 and 3 also illustrate the manner in which the cable is supported. A short length of cable or wire rope indicated in general by the numeral 27 is bent to provide a looped or curved upper end 29 and generally parallel ends 30 and 31. A metal ring or sleeve 32 is inserted over the end of the thermocouple cable A and is slit down a suitable distance from the cable end. The ends 30 and 31 are then inserted into the ring or sleeve 32 so that the looped portion 29 extends upwardly therefrom. A generally tier shaped member 32' which is of channel shaped section, preferably lies inwardly of the loop 29 and forms a reinforcement therefore so as to distribute the weight of the cable over a large area of the loop.

After the ends 30 and 31 have been inserted into the sleeve 32, the three cable portions are swaged or otherwise secured together and to the ring 32. This is permissible as the outer portion of the thermocouple cable A is of wire rope or strands as well as the cable loop 27. By this arrangement a support is provided which will readily support the weight of the cable without placing a strain upon the cable core.

As has been previously stated, the core of the cable A includes a series of thermocouple wires. The outer metal covering of the cable A is cut off at a point spaced from the end of the thermocouple wires so that these thermocouple wires may project beyond the end of the metal sheath. Each of the individual thermocouple wires is then electrically connected by soldering or otherwise to a corresponding wire within a lead cable 33. The end of the lead cable extends generally parallel to the end of the thermocouple wires projecting from the metallic sheath and the various connected wires are insulated one from the other and are taped together as indicated at 34 so as to provide an enclosure for electrical connections connecting the thermocouple cable to the lead cable.

In a preferred form of construction, the lead cable is looped into parallel relation to the end of a thermocouple cable sheath as indicated in Figure 2, and a clip 35 extends around the two cable portions to hold them in parallel relation and connected. In this way, a pull upon the lead cable will not disturb the electrical connection between this cable and the thermocouple wires.

With reference now to the lower end of Figure 2 of the drawings it will be noted that a weight 36 is provided at this lower cable end. In the particular form of construction illustrated, the weight 36 is generally cylindrical and elongated having inwardly tapered or rounded contour at its upper end as indicated at 37. The upper end of the weight is provided with an elongated axial recess 39 therein, which extends for a substantial distance from the top of the weight. The body of the weight is swaged against the cable below the rounded portion 37 of the weight, thus clamping the weight onto the cable. By applying sufficient pressure at this point, it has been found possible to provide a connection which is actually stronger than the cable itself.

In Figure 4 of the drawings is disclosed a modified form of weight construction. In this arrangement, the cable 40 is provided at its lower end with an encircling sleeve 41 which is swaged to the cable. This sleeve 41 is provided with a transverse opening 42 therethrough which is designed to accommodate a wire rope or cable loop 43. This loop 43 extends through the opening 42 and through a top transverse opening 44 in a weight 45 similar to a sash weight. A clip 46 ties the cable ends together to form a loop.

If preferred, the loop 43 may be formed of the cable itself or the cable might be otherwise attached to the weight 45.

The use of a weight at the lower end of a thermocouple cable is of extreme importance in view of the particular environment of the cable. In view of the fact that the grain bins are normally filled from the top thereof, the weight of the grain and the manner in which it drops into the bin has a tendency to flex the cable out of its normal position. Furthermore, when the bin of grain is substantially full and a door is opened at the bottom of the bin to permit some of the grain to escape, the grain moves downwardly in the bin with a swirling movement depending upon the position of the opening at the bottom of the bin and a terrific strain is placed upon the cable tending to flex it and bend it out of vertical position.

In the past, where pipes have been used to enclose the thermocouple circuits, and where these pipes are connected to the walls of the bin, in certain instances the swirling movement of the grain has caused sufficient pressure to tear the pipes free of the wall of the bin in spite of their firm anchorage thereto. When flexible cables have been used, it has been thought necessary to anchor them in the center of the bin and to tie the lower end of the flexible member to the bottom center of the bin with a connection which will fracture more readily than the cable itself. Thus, if undue strain is placed upon the cable as the grain is inserted or removed, it is possible for the cable to flex out of vertical position.

It has been recognized that it is desirable to suspend the thermocouple cable in the center of a bin of grain or, at least, in a fixed position therein. However, the applicant has also found that when grain is stored there is a certain amount of movement in the bin of grain and that even if the action of the grain in filling or partially emptying the bin has resulted in the swinging of the weight toward one wall or the other of the bin, the weight gradually works down toward the center of the bin and assumes a vertical position. Thus, it has been found that in many instances where the weight has been swung near one wall of the bin due to the action of the grain in leaving the bin, after a reasonable period of time, the cable will again assume the generally vertical position. Accordingly, the applicant has found it possible to employ merely a weight at the lower end of the cable where such a connection was previously thought impractical.

In accordance with the patent statutes, the principles of construction and operation of my thermocouple cable suspension have been described and while it has been endeavored to set forth the best embodiment thereof, it is desired to have it understood that obvious changes may be made within the scope of the following claims without departing from the spirit of the present invention.

I claim:

1. In combination with a grain storage bin which includes a vertically elongated hollow body, a support mounted near the top of said body, a flexible thermocouple cable having an end supported by said support and a free depending end extending downwardly into the interior of said body, spaced thermocouples within said cable, a lead-in connected to said thermocouples and a fixed weight on the lower extremity of said cable in spaced relation to the bottom of the bin.

2. The structure defined in claim 1 and in which the weight is vertically elongated, and secured at its upper extremity to said cable.

3. The structure described in claim 1 and in which the weight is vertically elongated, and includes a rounded upper end, and in which said upper end is connected to the cable.

4. The structure described in claim 1 and in which the weight is vertically elongated, and is secured in substantially coaxial relation to said cable.

5. The structure described in claim 1 and including means secured to said cable near the upper end thereof for supporting said cable.

6. A thermocouple cable supporting means in combination with a thermocouple cable having a relatively fixed end and a relatively elongated free depending end, said supporting means including a loop member having an upwardly looped upper end and parallel lower ends, means connecting the parallel lower ends to said cable at a point adjacent to the top thereof, cable support suspending means extending through said looped upper end, and a weight suspended with said cable at the lower end thereof.

7. In combination with a storage area a suspended longitudinally extending thermocouple cable having a free swinging unattached weighted lower end, a supported end and a lead-in cable, said thermocouple cable comprising an elongated cable having an outer sheath and a core of thermocouple wires, one end of said thermocouple cable being relatively fixed and the major portion of said cable depending from said relatively fixed end being free and unattached throughout the length and at the end thereof, a weight fixed to the free unattached end of said cable to normally maintain the same in vertical alignment throughout the length thereof, a supporting means attached to said relatively fixed end for suspending the longitudinal length and free weighted end of said cable, and a lead-in cable connected to the said thermocouple wires of said cable.

8. In combination with a storage area a thermocouple cable suspended therein having an attached upper end and a vertically depending unfixed and unattached lower end, a support for said cable at its attached end, a weight fixed to said cable at its unattached end, and a lead-in cable connected to the attached end of said thermocouple cable, whereby the depending unfixed and unattached cable end can be freely flexed out of its normally vertically depending position by the strain of storage material thereagainst, and is thereafter self-returned to its normally vertically depending position.

References Cited in the file of this patent

UNITED STATES PATENTS

| | | |
|---|---|---|
| 242,278 | Davidson | May 31, 1881 |
| 1,365,465 | DesIsles | Jan. 11, 1921 |
| 1,979,756 | McNamee | Nov. 6, 1934 |
| 2,609,689 | Harris | Sept. 9, 1952 |
| 2,640,867 | Clements | June 2, 1953 |
| 2,665,322 | MacDonald | Jan. 5, 1954 |

FOREIGN PATENTS

| | | |
|---|---|---|
| 284,197 | Switzerland | July 15, 1952 |